United States Patent
Berman et al.

(10) Patent No.: US 6,288,703 B1
(45) Date of Patent: Sep. 11, 2001

(54) METHOD FOR REMOVING FROM AN IMAGE THE BACKGROUND SURROUNDING A SELECTED SUBJECT BY GENERATING CANDIDATE MATTES

(75) Inventors: Arie Berman, Chatsworth; Paul Vlahos, Tarzana; Arpag Dadourian, Northridge, all of CA (US)

(73) Assignee: Ultimatte Corporation, Chatsworth, CA (US)

( * ) Notice: Subject to any disclaimer, the term of this patent is extended or adjusted under 35 U.S.C. 154(b) by 0 days.

(21) Appl. No.: 09/317,358

(22) Filed: May 24, 1999

Related U.S. Application Data (63) Continuation-in-part of application No. 08/758,185, filed on Nov. 25, 1996, now Pat. No. 5,907,315.

(51) Int. Cl.$^7$ .................................................. G09G 5/00
(52) U.S. Cl. ...................... 345/150; 345/114; 345/421; 348/586; 348/650; 382/163; 382/167
(58) Field of Search .................... 382/162, 163, 382/167, 282; 348/584, 586, 587, 590, 591, 592, 650, 578, 582, 599; 345/114, 154, 421, 422, 427, 473, 336, 113, 112, 426, 335, 342, 145, 150, 157

(56) References Cited

U.S. PATENT DOCUMENTS

| | | | |
|---|---|---|---|
| 4,100,569 | * 7/1978 | Vlahos | 358/22 |
| 4,344,085 | * 8/1982 | Vlahos | 358/22 |
| 4,589,013 | * 5/1986 | Vlahos | 358/22 |
| 4,625,231 | * 11/1986 | Vlahos | 358/22 |
| 5,032,901 | * 7/1991 | Vlahos | 358/22 |
| 5,343,252 | * 8/1994 | Dadourian | 348/586 |
| 5,355,174 | * 10/1994 | Mishima | 348/592 |
| 5,424,781 | * 6/1995 | Vlahos | 348/587 |
| 5,469,536 | * 11/1995 | Blank | 395/131 |
| 5,519,826 | * 5/1996 | Harper | 395/152 |
| 5,907,315 | * 5/1999 | Vlahos | 345/114 |
| 6,134,345 | * 10/2000 | Berman | 382/162 |
| 6,134,346 | * 10/2000 | Berman | 382/163 |

* cited by examiner

Primary Examiner—Matthew Luu
Assistant Examiner—Wesner Sajous
(74) Attorney, Agent, or Firm—Blakely Sokoloff Taylor & Zafman (57) ABSTRACT

In an image being displayed on a monitor, each observed background color is identified using a cursor to select the dominant colors. Each foreground color is also identified by using the cursor as a selector. For each pixel, several Candidate mattes are computed one for each background color. Each Candidate matte is computed from a single background color and the set of selected foreground colors using any known method. Of the several Candidate mattes, the greater of these Candidates becomes the matte signal for a given pixel. If this matte is 1.0, then the pixel is part of the background. If the matte is zero, then the pixel is part of the subject. If the matte is between 1.0 and 0.0, then the pixel is in a transition area and the contribution of the background to the pixel is that pixel's matte level. A 'Processed Foreground' is generated by removing the contribution of the background from each pixel in the image, resulting in the subject appearing against a black field. The above generated Candidate mattes permit the generation of Processed Foreground Candidates. Of these Processed Foreground Candidates, the smallest is the final Processed Foreground for a given pixel.

10 Claims, 6 Drawing Sheets

METHOD FOR REMOVING FROM AN IMAGE THE BACKGROUND SURROUNDING A SELECTED SUBJECT BY GENERATING CANDIDATE MATTES

This is a continuation-in-part of application Ser. No. 08/758,185 filed on Nov. 25, 1996 now U.S. Pat No. 5,907,315.

BACKGROUND

Motion picture Travelling Matte

In the motion picture industry, the travelling matte process photographs a subject before a backing of uniform color and luminance. A matte signal is generated from the color differences between the colored backing and the subject. This matte signal permits removal of the colored backing, and the subsequent insertion of a different background.

The matte signal is simply a measure of the visibility of the background in the photographed scene. It can also be expressed as the contribution of the background to each pixel in the image frame. Since the background cannot be seen behind an opaque foreground subject, its contribution (matte) is zero. In all areas of the background not obscured by the subject, the background is fully visible, and the matte is therefore 1.0.

The matte is a fraction between 0.0 and 1.0, at the edge of moving or out-of-focus subjects where a semitransparent blur occurs, and for semitransparent and translucent objects such as glassware, smoke, or fog. Semitransparent subject areas contain a mix of the subject color and the color of the background since both occupy the same area. It is the background contribution that must be removed from these semitransparent areas. The matte signal is a measure of that contribution, and is used for its removal.

The above process has been well developed and is literally flawless for most subjects. See U.S. Pat. Nos. 4,100,569, 4,344,085; 4,625,231, 5,032,901, 5,343,252, and 5,424,781.

In both motion pictures and graphic arts, it is often necessary to select a foreground subject in an existing scene and remove its background, so that a different background may be inserted. The well developed matte equations for uniform colored backings do not apply to a background consisting of multiple colors and objects such as people, streets, trees, buildings and blue sky.

The development of a workable background extraction method for such complex backgrounds is described in U.S. patent applications Ser. Nos. 09/008,270 and 09/141,703. This extraction method employs a computer, cursor and monitor for manipulation of picture elements.

Application Ser. No. 09/008,270 is briefly reviewed here, since reference to this method will be made in the disclosure of the present invention. A boundary line is drawn on the background just outside the subject, on the original image, to isolate the background from the foreground subject. The isolated background is assigned a matte level of 1.0 since it is unobscured by the subject. A second boundary line is drawn just inside the subject to isolate the opaque subject, and this isolated subject area is assigned a matte level of zero. Between these two boundary lines is the transition area between subject and background. Semitransparent subject edges due to subject motion, or lack of sharp focus, are included in the transition area.

A background reference frame is computer generated by extrapolation and interpolation of the RGB levels of background pixels into and through the area occupied by the subject. The background reference frame is what one would have seen in the absence of the subject. This reference frame need be relatively accurate only through the transition area between the two outlines.

A foreground subject reference frame is generated by extrapolating the subject RGB levels near the subject edges to stretch the subject out through and beyond the outlined transition area.

Each pixel in the original image frame has a corresponding address in each of the two reference frames. These three frames each have separate colors for the same pixel address. These three colors can be shown as three points in a three dimensional color space as noted in FIG. 2 of the referenced application Ser. No. 09/008,270. The position of the image pixel color with respect to the background and foreground reference frame colors determines the contribution (matte level) of the background to the image pixel.

The above method requires the drawing of a line on each side of the transition between subject and background. While this method worked very well for most subjects and backgrounds, consider a complex subject such as a leafy tree covering much of the image frame. The background shows blue sky, white clouds and mountains. Portions of the leaves are illuminated by the sun, and the sky peeks through between clumps of leaves.

There is no expedient way to separate foreground and background by drawing boundary lines. These kinds of busy subjects and backgrounds led to the invention of an alternative method, described below, in which the matte is generated from multiple conditional and Candidate mattes.

SUMMARY OF THE INVENTION

Each observed background color is identified to the computer by using a cursor to select the dominant colors. Each foreground color is also identified to the computer by using the cursor as a selector. For each pixel, several Candidate mattes are computed—one for each background color. Each Candidate matte is computed from a single background color and the set of selected foreground colors using any known method such as the method described in U.S. Pat. No. 5,355,174 (Mishima, Oct. 11, 1994). Of the several Candidate mattes, the greater of these Candidates becomes the Matte Signal for a given pixel. If this matte is 1.0, then the pixel is part of the background. If the matte is zero, then the pixel is part of the subject. If the matte is between 1.0 and 0.0, then the pixel is in a transition area and the contribution of the background to the pixel is that pixel's matte level.

A 'Processed Foreground' is generated by removing the contribution of the background from each pixel in the image, resulting in the subject appearing against a black field. The above generated Candidate mattes permit the generation of Processed Foreground Candidates. Of these Processed Foreground Candidates, the smallest is the final Processed Foreground for a given pixel.

DETAILED DESCRIPTION OF THE INVENTION

The two requirements for replacing an original background with a different background are, 1) a matte signal level must be determined for each pixel in the original image. This is the most difficult function to achieve for any matting system. 2) the matte signal is then used to generate the Processed Foreground for each pixel by removing the background. The Processed Foreground (PrFg) consists of all of the foreground subject and none of the background. It is the foreground subject in full color against a black field.

The new background, multiplied by the matte signal, is the Processed Background. The new background is inserted behind the foreground subject by simply adding the RGB levels of the Processed Background to the RGB levels of corresponding pixels in the Processed Foreground.

Figure 1:
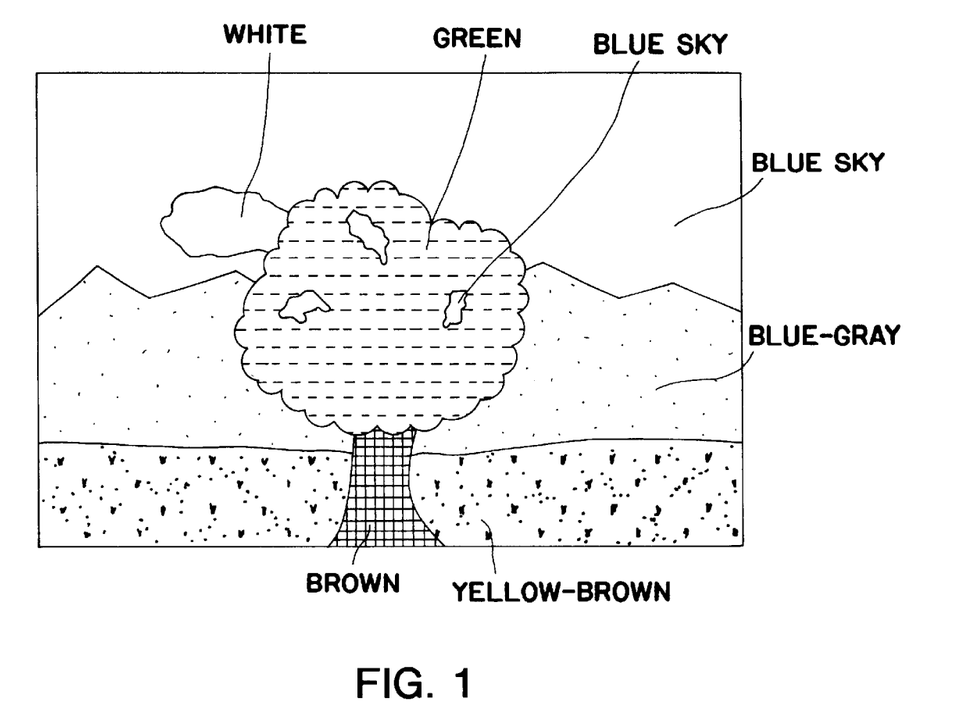
FIG. 1 shows a tree against a blue sky, white clouds, and mountains in the background.

This invention is best explained with the aid of an example using FIG. 1. The tree in the foreground (Fg) of FIG. 1 is the selected foreground subject. The brown trunk and limbs will be a lighter brown on the side illuminated directly by the sun. Using the cursor, both the shaded and sunny side of the trunk are identified to the computer as subject colors.

The green leaves are a lighter shade of green on the under side than on their top side, and both are brighter and warmer when in the sun. Using the cursor, the four foliage colors are also identified to the computer as subject colors, making six subject colors. Neither the specific pixel locations or boundaries of these colors is known.

In the background is seen white clouds, bright blue sky, dark blue-gray mountains, and yellow-brown grass extending to the mountains. The cursor identifies these four background colors to the computer, but their specific pixel locations and boundaries are unknown.

Using the cursor in this manner, a sample of the colors in the foreground are selected and a sample of the colors in the background are selected. The sample selected should be enough to represent the dominant colors in the foreground and background. Although the images which are typically the subject of a process of this type have millions of colors per frame, the sample size needed to represent the dominant colors is typically 10–15 sample points for each of the foreground and background.

In such overlapping of complex subjects and complex backgrounds, it is not practical to draw an inner and outer boundary line around each leaf of the tree to separate elements of the Fg from the Bg. Without such identified separation, it is not possible to generate a single interpolated Bg (background) reference frame, nor a single extrapolated Fg reference frame, as used in the referenced application Ser. No. 09/008,270.

There is no apriori knowledge that the color content of an image pixel (Pix) is that of a background color, or a foreground color. (Or, a mix of these two colors when the pixel occurs in a semitransparent subject area between the two). It is therefore necessary to generate a conditional matte for each combination of Bg and Fg color. With four Bg colors and six Fg colors, there will be six conditional mattes for each Bg color, for a total of 24 mattes for the image of FIG. 1. Only one of these mattes can be valid for a given pixel.

Figure 2:
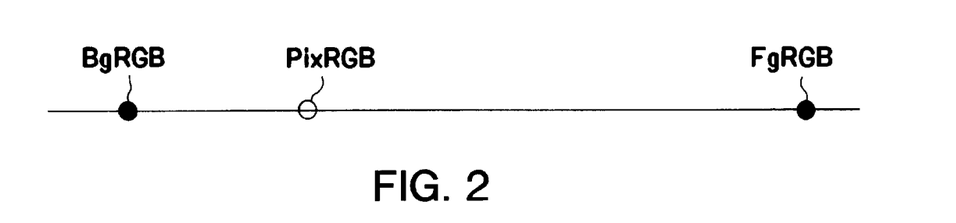
FIG. 2 shows the colors of a background, foreground, and image pixel displayed in a one dimensional representation of three dimensional color space.

Three colors; BgRGB, PixRGB and FgRGB can be shown as three points in a three dimensional color space, as illustrated in FIG. 2 of the referenced application Ser. No. 09/008,270. Any line connecting the Bg and Fg colors in color space can, from some perspective, be seen as a line on a flat plane as in FIG. 2 in this disclosure. On this line, the foreground (Fg) color is shown to the right, the background color (Bg) to the left, and the observed color of a transition pixel (Pix) will lie somewhere between them.

The matte level for any pixel may be shown in FIG. 2. The matte is simply the distance from the image pixel color to the Fg color, divided by the distance from the Bg color to the Fg color.

$$\text{Matte}=D(\text{Pix},\text{Fg})/D(\text{Bg},\text{Fg}) \qquad \text{Eq. 1}$$

If the Bg–Fg base line is thought of as 1.0, then the matte level is the distance of the pixel from the Fg color.

Pixels in a transition area between BGRGB and FgRGB will lie on the straight line connecting the points Bg and Fg of FIG. 2. The matte levels of transition pixels is determined by Eq. 1. If the pixel color is coincident with a Bg color then it is a part of the Bg and its matte level is 1.0. If a pixel color is coincident with a Fg color, then the pixel is a part of the Fg and its matte level is 0.0.

Of the conditional mattes generated for a background color, the conditional matte having the lowest value is that color's Candidate matte. Of the Candidate mattes, (one for each Bg color) the Candidate having the largest numerical value is the Matte Level for the image pixel being examined.

The matte generation method of the Imagica Corp. U.S. Pat. No. 5,355,174, for blue screen image compositing, could be used to generate a candidate matte for a selected Bg color and a set of selected Fg colors, for each of the Bg colors in a scene.

However, the generation of conditional mattes using single points in a three dimensional color space to represent each color, as described in the referenced application, is believed to result in a more accurate determination of the Candidate mattes.

The matte level for every pixel in the image, and the Processed Foreground, may be determined by generating conditional and Candidate mattes, and conditional and Candidate Processed Foreground (PrFg) signals.

Background colors are identified as $Bg_1$, $Bg_2$, $B_3$, - - - $Bg_{nB}$ Foreground colors are identified as $Fg_1$, $Fg_2$, $Fg_3$, - - - $Fg_{nF}$ For a selected background color, the conditional mattes are identified as $cm_1$, $cm_2$, $cm_3$, - - - $cm_{nF}$. Candidate mattes are identified as CM1, CM2, CM3 - - - $CM_{nB}$. The required number of conditional mattes ($cm_x$), for each unidentified pixel in the image frame, is the number of Bg colors, multiplied by the number of Fg colors.

$$cm_x = nF*nB \qquad \text{Eq. 2}$$

In the scene of FIG. 1, there were four Bg colors and six Fg colors. For Bg color 1, ($Bg_1$), six conditional mattes ($cm_1$–$cm_6$), one for each Fg color, will be generated. Of these six mattes, the matte with the lowest numerical value becomes the Candidate matte for the first Bg color.

Using the same procedure, six conditional and one Candidate matte is generated for each of the remaining (3)

background colors, of the four Candidate mattes, the Candidate matte with the largest numerical value becomes the Matte for a designated pixel. The above procedures are applied to all pixels in the image frame.

The Processed Foreground signal level is determined as follows: From the preceding computations, six conditional mattes are computed for a current pixel using a first background color and each of the six foreground colors.

For the first background color, a conditional Processed Foreground signal (cPrFg) may be generated for each of the six foreground colors using the equations $$cPrFg1 = PixRGB - [Bg_1 RGB * cm_1]$$

$$cPrFg2 = PixRGB - [Bg_1 RGB * cm_2]$$

$$cPrFg3 = PixRGB - [Bg_1 RGB * cm_3]$$

$$cPrFg4 = PixRGB - [Bg_1 RGB * cm_4]$$

$$cPrFg5 = PixRGB - [Bg_1 RGB * cm_5]$$

$$cPrFg6 = PixRGB - [Bg_1 RGB * cm_6]$$

PixRGB=The Red, Green, and Blue levels of the current pixel.

$$PixRGB - [BgRGB * cm_1] \text{ means: } Pix\ R - [Bg\ R * cm_1]$$
$$Pix\ G - [Bg\ G * cm_1]$$
$$Pix\ B - [Bg\ B * cm_1]$$

Of the six conditional processed foreground (cPrFg) signals computed above for the first background color, the larger of these is designated the PrFg Candidate.

In calculating the conditional mattes for each background color, one of these (the smallest) was selected as the Candidate matte. Since these conditional mattes will be known prior to computing the processed foreground, one may determine the Candidate Processed Foreground in a single calculation using the smallest conditional matte, because it will result in the largest Candidate Processed Foreground. In effect, the Candidate processed foreground is computed using the Candidate matte. It can be computed by subtracting the product of the Candidate matte and the (corresponding) background color, regardless of how the Candidate matte was computed.

$$CPrFg = PixRGB - [BgRGB * CM] \quad \text{Eq. 3}$$

Since there were four background colors in the FIG. 1 example, the above process is repeated for the other three background colors, to produce a total of four PrFg Candidates. Of these four Candidates the minimum Candidate is the Processed Foreground signal for this current pixel. This process is repeated for each pixel in the image frame.

The above determined matte signals and Processed Foreground signals effect the removal of the initial background around the selected subject as well as any portion of the background seen through semitransparent and translucent areas of the foreground subject.

OPTIONS

The "conditional and Candidate" matte and processed foreground computations, using a "min-max" computation as described above can be applied in reverse, selecting first a max of the conditional mattes as a Candidate for each foreground color, and then selecting the min of these Candidates as the final matte (and the max of the candidate processed foregrounds as the final processed foreground). In either case, a conditional matte is generated for each foreground-background color combination, and the final matte is the same.

Images vary widely in their subject and color complexity. While the matte generation described above included every pixel in the image, it is possible to greatly reduce the processing time by reducing the number of required calculations.

The color distribution in a part of the image, such as a large area of blue sky shading to gray at the horizon, is not one background color, but perhaps a dozen background colors. However, multiple areas of the sky can be sampled including small isolated areas wherever they may appear. Multiple samples permit the generation of a partial (sky only) background reference frame, by interpolation. Interpolation provides a relatively good estimate of the sky color in all parts of the sky whether visible or hidden.

The interpolated partial background frame provides a new background color in addition to the previous four, and just like the other four background colors, may be used to compute an additional Candidate matte (and processed foreground) from which the final matte (and processed foreground) is derived.

One may also choose to use this interpolated partial background frame to generate the only Candidate matte for the blue sky. The advantage in using an extrapolated partial reference frame is that it generates a more accurate matte, and reduces calculation time. The same procedure may be useful for other large background areas.

In many images one may reduce the number of calculations by enclosing areas of the unobstructed background, and also enclosing areas of the opaque foreground, by identifying these areas using the cursor. Pixels in these defined background and foreground zones (areas) are assigned a matte signal of 1.0 and zero respectively, and do not require computation.

After excluding the defined background and foreground zones, the remaining image area is principally transition areas, bordered by a little of the background and foreground that could not be excluded in the hand drawn zone boundaries. For each pixel not excluded by the background and foreground zones, a circle or any other selected shape is automatically computer generated, with the pixel initially at its center. The circle automatically expands until it is large enough to include some of the background (matte of 1.0) and some of the foreground (matte of 0.0), and preferably a bit larger. Only those colors in these nearest background and foreground areas have a reasonable probability of contributing to the color of a pixel in the transition area between them.

Those colors in the background encompassed by the circle, and those colors of the foreground encompassed by the circle have automatically become the sampled background and foreground colors from which the conditional and Candidate mattes are calculated for a given pixel. This automatic selection of background and foreground colors minimizes the number of Fg and Bg colors entering into the matte calculations for said pixel. The circle size, and automatically selected colors, are reestablished for each successive pixel.

Once the circle has entered a background zone (for example), it need not expand much further into said background zone, but it must continue to expand until it encompasses pixels in the Foreground zone. This unequal expansion is a circle no longer centered on the original pixel, however the original pixel is still the pixel for which the matte is calculated.

It is also possible to designate an area in the image and use only those background and foreground colors found in the designated area in the computation of the matte for pixels within that area. Several such areas can be designated, each with its own set of background or foreground colors Alternatively, it is also possible to designate an area in the image within which certain previously selected background colors will not be used as background colors when computing the matte within that area. The same applies to foreground colors. Several such areas can be designated, each with its own limitations on background or foreground colors.

The purpose of designating such areas is to reduce computation time and to improve the accuracy of the matte, when the content of the image warrants its subdivision into two or more areas.

Figure 3:
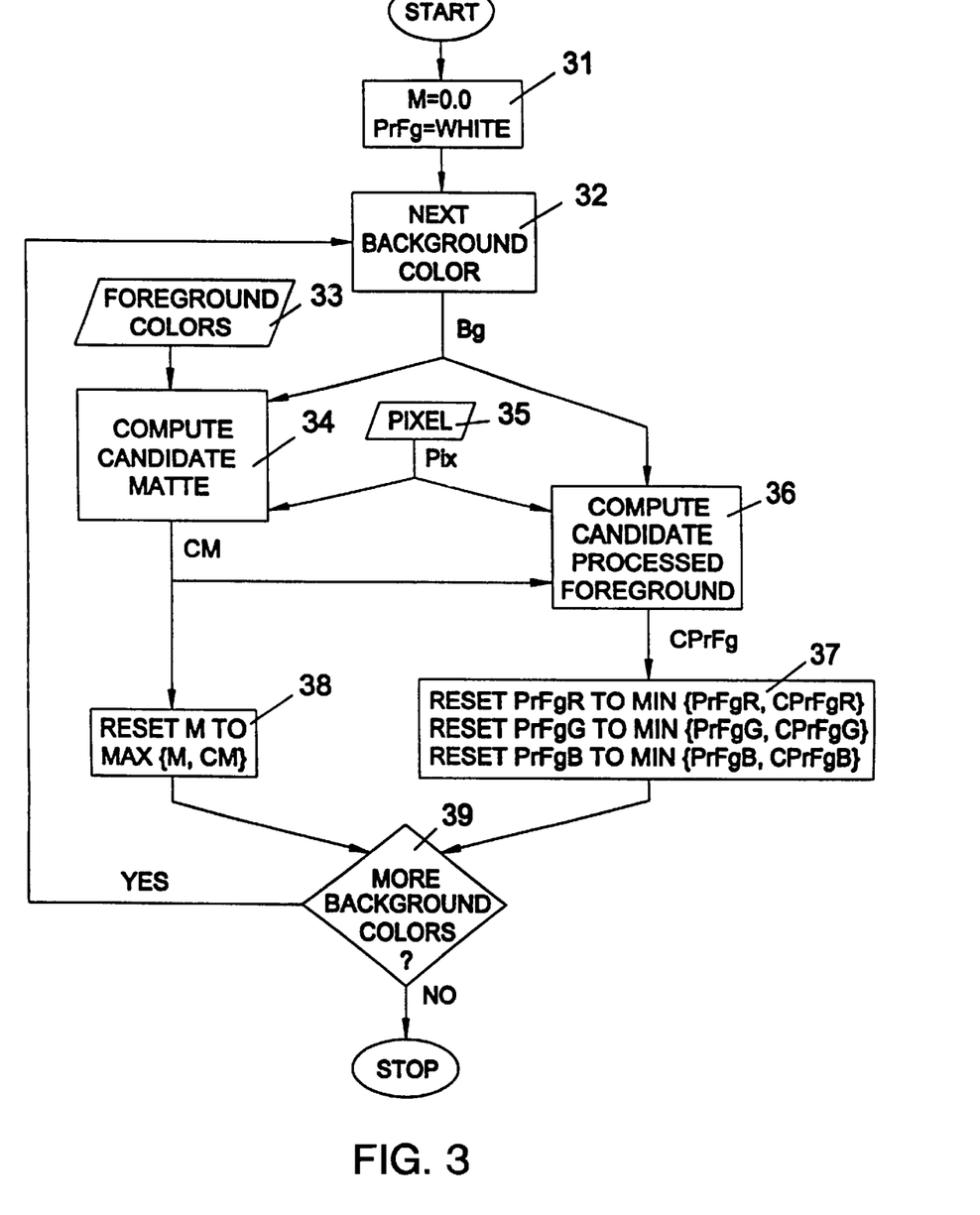
FIG. 3 shows the flow chart of the steps required for computing a matte M for a pixel in a computer implementation of the invention.

FIG. 3 is a block diagram of the computation of a matte for a given pixel. The matte M (a level) and the processed foreground PrFg (a color) are initialized (block 31); the matte to zero (black), and the processed foreground to white. The first background color Bg from the list of background colors is selected (block 32). This color, together with the set of foreground colors (block 33) and the given pixel color Pix (block 35) are used to compute a candidate matte CM (block 34). This candidate matte, along with the background color Bg and the pixel color Pix are also used to compute a candidate processed foreground CPrFg (block 36). If this candidate matte CM is greater than the matte M, the matte M is reset to CM (block 38). If the candidate processed foreground CPrFg is less than the processed foreground PrFg in any color component (e.g. red, green or blue), that component of the processed foreground PrFg is reset to its level in CPrFg (block 37). If there are more background colors on the list (block 39), the process is repeated for the next background color (block 32). When there are no more background colors on the list, the resulting matte M is the matte for the pixel.

Figure 4:
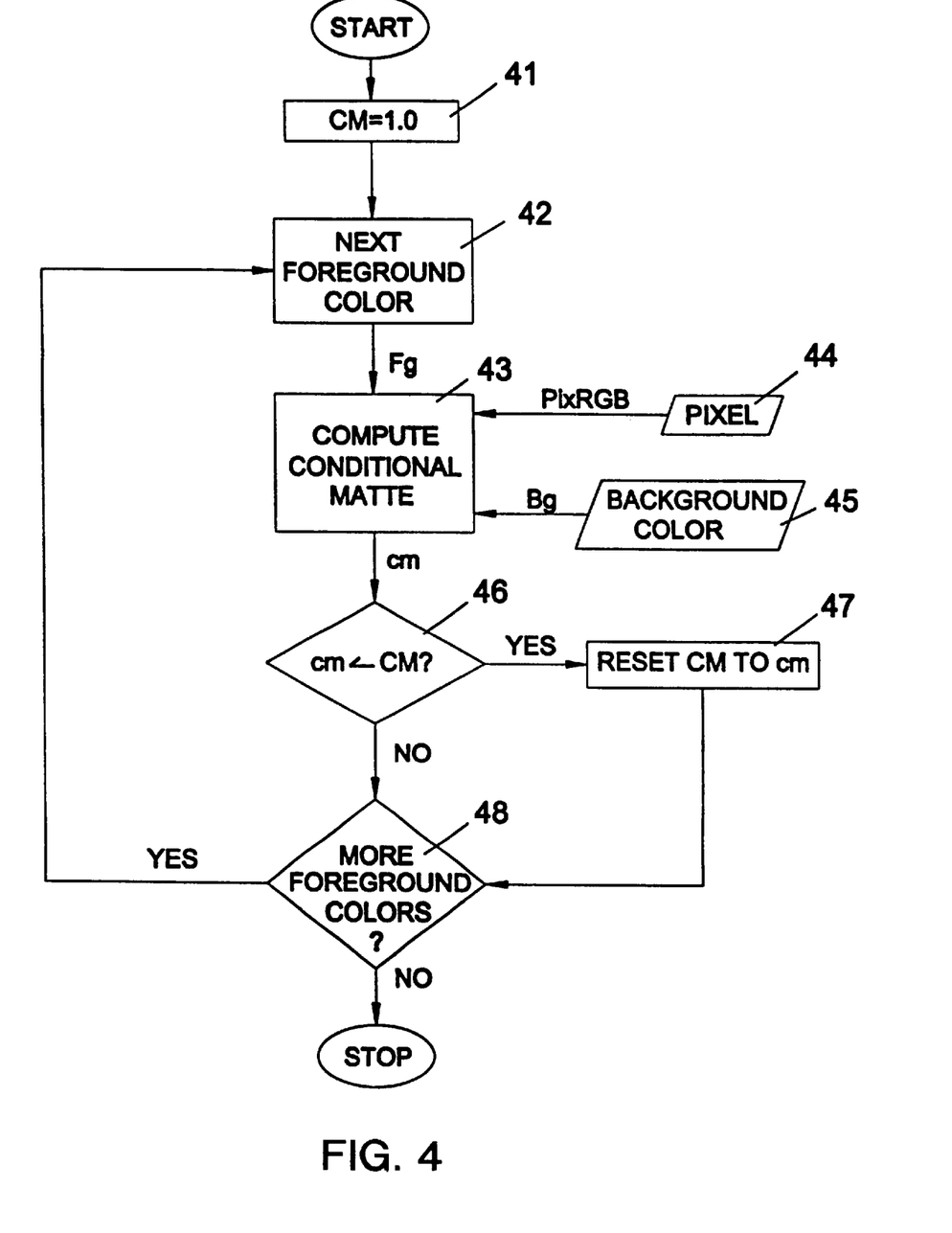
FIG. 4 shows a detailed flow chart of "COMPUTE CANDIDATE MATTE" block of FIG. 3.

FIG. 4 is a block diagram of the computation of a candidate matte for a given pixel color PixRGB (block 44) and a given background color Bg (block 45). The conditional matte CM is initialized (block 41) to 1.0 (the highest possible value). The first foreground color Fg from the list of foreground colors is selected (block 42). This color, together with the given background color Bg (block 45) and the given pixel color Pix (block 44) are used to compute a conditional matte cm (block 43). If this conditional matte cm is lower than the candidate matte CM (block 46), the candidate matte CM is reset to cm (block 47). If there are more foreground colors on the list (block 48), the process is repeated for the next foreground color (block 42). When there are no more foreground colors on the list, the resulting candidate matte CM is the candidate matte for the given pixel and the given background color.

Figure 5:
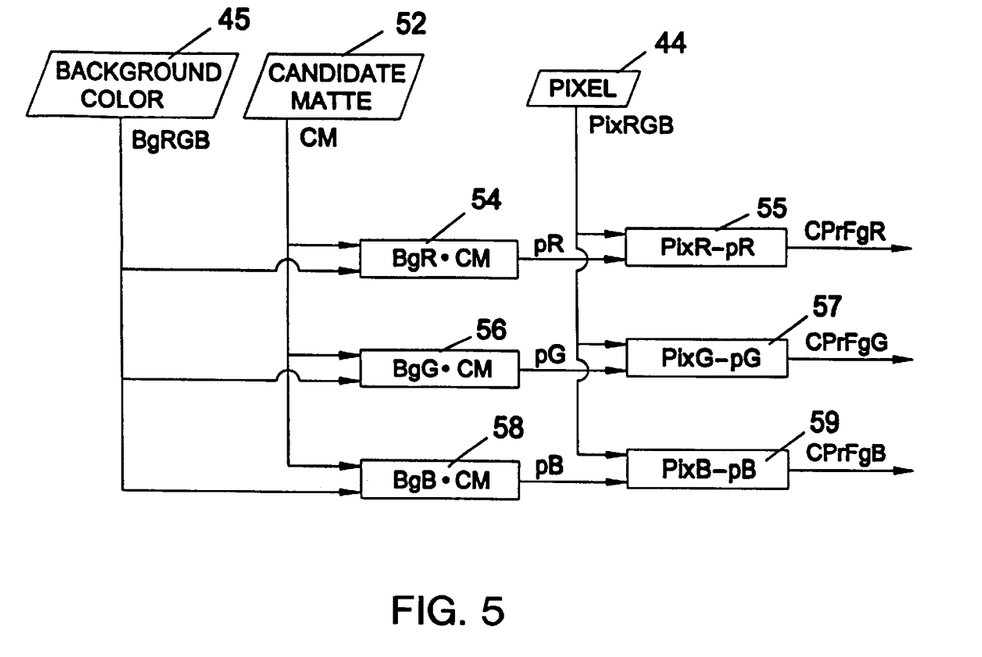
FIG. 5 shows a detailed flow chart of "COMPUTE CANDIDATE PROCESSED FOREGROUND" block of FIG. 3.

FIG. 5 is a block diagram of the computation of a candidate processed foreground for a given pixel and a given background color. The candidate matte CM (block 52) for the given background color BgRGB (block 45), and that background color BgRGB (block 45), are multiplied (blocks 54, 56, and 58), producing the product pR, pG, pB (an RGB color). This product is then subtracted (blocks 55, 57, and 59) from the pixel color PixRGB (block 44), producing the differences CPrFgR, CPrFgG, CPrFgB (an RGB color), the candidate processed foreground.

Figure 6:
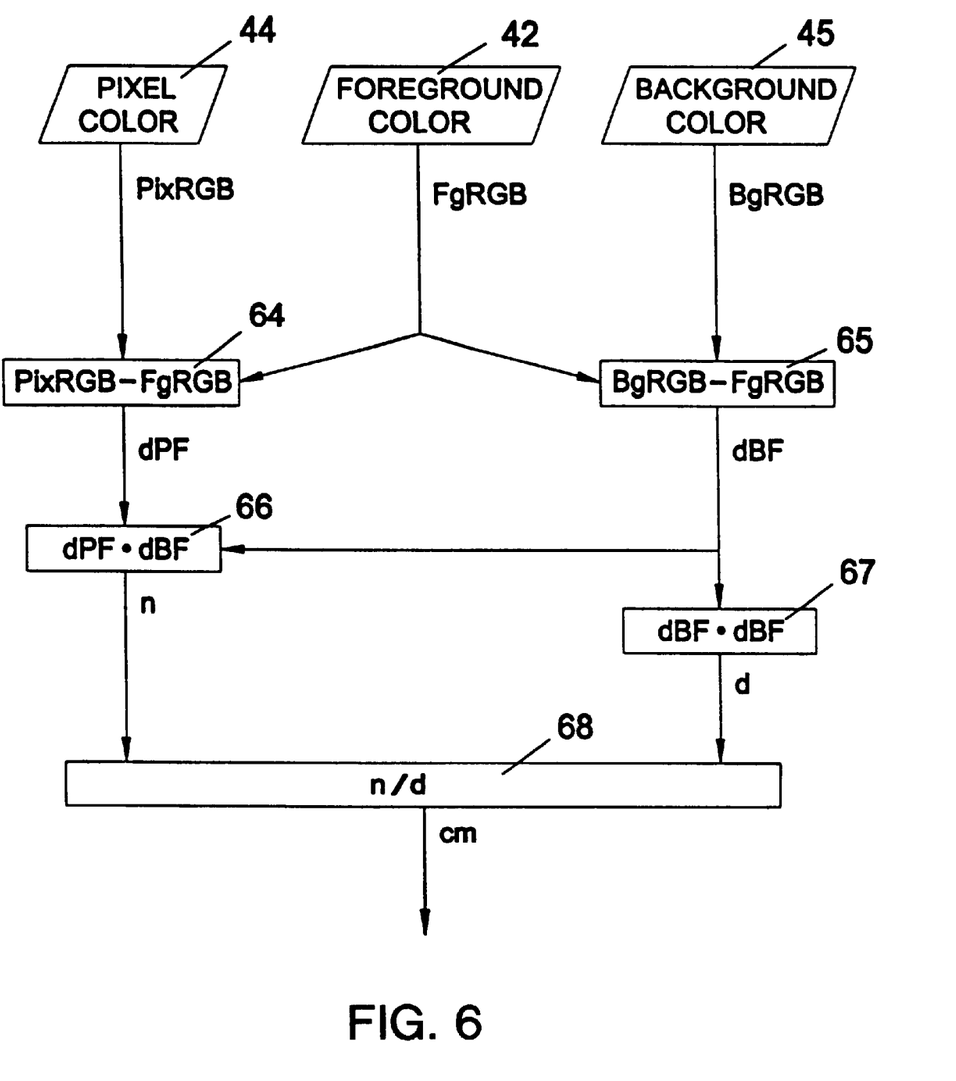
FIG. 6 shows a detailed flow chart of "COMPUTE CONDITIONAL MATTE" block of FIG. 4.

FIG. 6 is a block diagram of a conditional matte for a given pixel color, foreground color, and background color. The foreground color FgRGB (block 42) is subtracted (block 64) from the pixel color PixRGB (block 44) producing the vector difference dPF. The foreground color FgRGB (block 42) is also subtracted (block 65) from the background color BgRGB (block 3) producing the vector difference dBF. A dot product of dPF with dBF is computed (block 66) producing the number n, and a dot product of dBF with itself is computed (block 67) producing the number d. The number n is divided by the number d (block 68) producing the quotient cm, the conditional matte.

Figure 7:
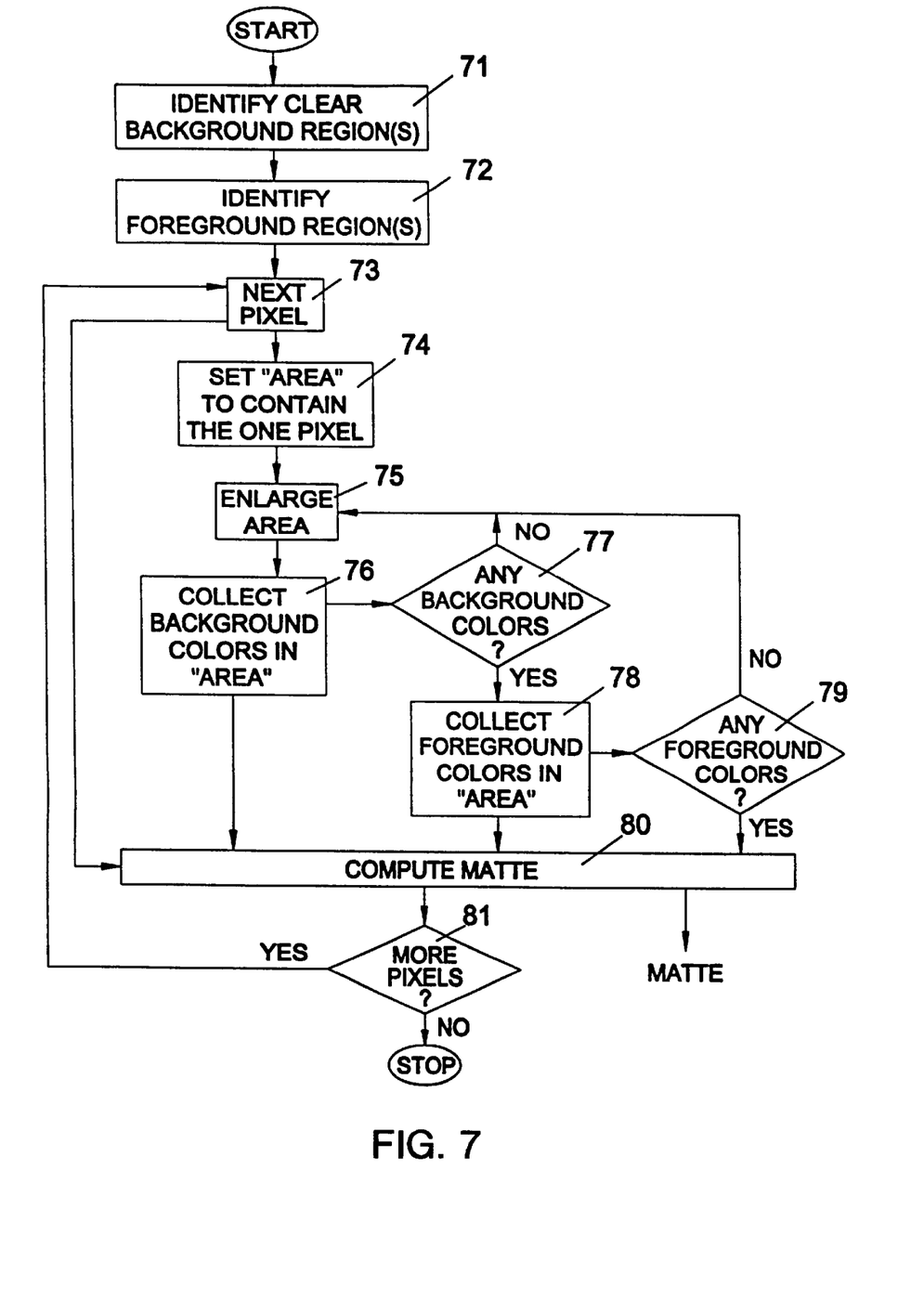
FIG. 7 shows the flow chart of an automatic selection of background and foreground colors for each pixel.

FIG. 7 is a block diagram of matte computation using automatic selection of background and foreground colors for each pixel. A region of the image consisting of unobscured background is identified (block 71). Another region of the image consisting of opaque subject colors is also identified (block 72). The first pixel is selected (block 73), and an area consisting only of that pixel is formed (block 74). That area is enlarged by a preset increment (block 75). The set of colors found in this area which are also in the region identified as background are collected (block 76). If this set is empty (block 77), the area is enlarged (block 75) and the color collection step is repeated. If this set is not empty, the set of colors found in this area which are also in the region identified as foreground are collected (block 78). If this set is empty (block 79), the area is enlarged (block 5) and the color collection steps are repeated. The collected background colors (block 76), foreground colors (block 78), and the pixel color (block 73) are then used to compute a matte (block 80) for the pixel. If there are more pixels (block 81), the process is repeated for the next pixel (block 73).

We claim:

1. A method for determining a color contribution of a background of each image pixel (PixRGB) in a stored image when said image includes a complex multicolored foreground subject in front of a complex multicolored background, comprising the steps of;

a) identifying to a computer, by cursor or equivalent, a sample of colors representing dominant colors found in the background, b) identifying to a computer by cursor or equivalent, a sample of colors representing dominant colors found in the foreground subject, c) generating Candidate mattes, one for each of said sampled background colors, using one of said sample background colors and said identified foreground colors, d) selecting from all Candidate mattes, the largest Candidate as a matte level for said image pixel, e) repeating steps (a) through (d) for each of the remaining pixels in the image, thus producing the matte level for all pixels in the image.

2. The method of claim 1 in which a Candidate matte for each of the identified background colors is determined by generating conditional mattes for each background and foreground color combination, said determination of said Candidate mattes comprising the steps of;

a) locating a first image pixel color, PixRGB, a first background color, $Bg_1RGB$, and a first foreground color, $Fg_1RGB$, as single points in a three dimensional color space, b) calculating a ratio of a distance, in three dimensional color space from PixRGB to $Fg_1RGB$, to the distance from $Bg_1RGB$ to $Fg_1RGB$, where said ratio is a first conditional matte generated from a first background color, and a first foreground color, c) repeating steps a) and b) for a second foreground color thus generating a second conditional matte for said first background color, d) repeating step c) for each remaining foreground color thereby generating for said first background color, conditional mattes equal to the number of foreground colors, e) selecting from said conditional mattes generated for one of said background colors the smaller of said conditional mattes as the Candidate matte for said background color, f) repeating steps a)–e) for the second and subsequent background colors thereby generating a Candidate matte for each of the background colors.

3. A method for determining a color contribution of a background of each image pixel (PixRGB) in a stored image when said image includes a complex multicolored foreground subject in front of a complex multicolored background, comprising the steps of;

a) identifying to a computer, by cursor or equivalent, a sample of colors representing dominant colors found in the background, b) identifying to a computer by cursor or equivalent, a sample of colors representing dominant colors found in the foreground subject, c) generating Candidate mattes, one for each of said sampled foreground colors, using one of said sample foreground colors and said identified background colors, d) selecting from all Candidate mattes, the smallest Candidate as a matte level for said image pixel, e) repeating steps (a) through (d) for each of the remaining pixels in the image, thus producing the matte level for all pixels in the image.

4. The method of claim 2 in which a Candidate matte is computed for each foreground color by selecting the largest of the several conditional mattes computed for said foreground color.

5. A method for generating a processed foreground signal for each pixel in an image from Candidate mattes and background colors, said method comprising the following steps;

a) selecting a Candidate matte ($CM_1$) for a first background color $Bg_1RGB$, b) generating a candidate processed foreground CPrFg from the equation CPrFg=PixRGB−($Bg_1RGB*CM_1$), c) selecting a Candidate matte for the second and subsequent background colors ($CM_2$ - - - $CM_n$)

d) generating a candidate processed foreground cPrFg as in step "b" for the second and subsequent background colors, thus generating a processed foreground candidate for each background color, e) selecting a minimum of said processed foreground candidates as the processed foreground signal for said image pixel, f) repeating steps (a) through (e) for each pixel in the image, thus generating the processed foreground signal for all pixels in the image.

6. The method of claim 5 in which a candidate processed foreground is generated for each foreground color, by using the candidate matte generated for said foreground color, and selecting a maximum of said processed foreground candidates as the processed foreground signal for said image pixel.

7. A method for replacing an existing multicolored background in an image with a new background where said new background is visible to the extent the existing background was visible through semitransparent and translucent areas of a foreground subject, said method comprising the steps of;

a) generating a matte signal identifying a contribution of the existing background to each pixel in the foreground, b) generating a processed foreground signal having RGB levels in which all existing background contribution to the image is removed, c) generating a processed background signal having RGB levels by multiplying a new background signal representing said new background by said matte signal, d) generating a composite image of the foreground signal and the new background signal by adding RGB levels of the processed background signal to the RGB levels of corresponding pixels in the processed foreground signal.

8. The method of claim 1 in which matte computation is reduced and matte accuracy is improved by restricting, for a given pixel, background and foreground colors to those having a reasonable probability of contributing to the matte computation for said pixel, and said colors are automatically selected, said selection comprising the steps of;

a) using the cursor to encompass areas containing only unobscured background pixels, and to encompass foreground pixels only in opaque subject areas, and assigning a matte level of 1.0 and 0.0 respectively to said encompassed background and foreground areas, b) generating a circle centered on an image pixel located outside said encompassed areas, c) enlarging said circle until it encompasses some of the background pixels having an assigned matte level of 1.0, and some of the foreground pixels having an assigned matte level of 0.0, the colors of said background and said foreground pixels becoming the background and foreground colors entering into the calculation of the matte signal for said image pixel.

9. The method of claim 8 in which said enlarged circle is expanded asymmetrically about said image pixel.

10. The method of claim 1, in which only those colors found within user designated background areas, and only those colors found within user designated foreground areas, are used in the calculation of matte signal levels.

* * * * *